United States Patent
Liu

(10) Patent No.: US 8,251,323 B2
(45) Date of Patent: Aug. 28, 2012

(54) SUCTION CUP

(75) Inventor: Sheng-Yu Liu, Taipei (TW)

(73) Assignee: Free-Fire Industrial Corp. (TW)

( * ) Notice: Subject to any disclaimer, the term of this patent is extended or adjusted under 35 U.S.C. 154(b) by 0 days.

(21) Appl. No.: 12/915,389

(22) Filed: Oct. 29, 2010

(65) Prior Publication Data

US 2012/0104217 A1    May 3, 2012

(51) Int. Cl.
*A45D 42/14* (2006.01)
(52) U.S. Cl. ............... 248/206.2; 248/309.3; 248/205.5
(58) Field of Classification Search ............... 248/683, 248/467, 205.5, 206.2, 309.3, 363
See application file for complete search history.

(56) References Cited

U.S. PATENT DOCUMENTS

| | | | | |
|---|---|---|---|---|
| 4,588,153 A * | 5/1986 | Boston et al. | ............ | 248/74.2 |
| 5,176,346 A * | 1/1993 | Liu | ............ | 248/206.1 |
| 5,402,974 A * | 4/1995 | Adams | ............ | 248/205.5 |
| 5,645,254 A * | 7/1997 | Ng et al. | ............ | 248/206.2 |
| 6,244,778 B1 * | 6/2001 | Chesbrough | ............ | 403/51 |
| 6,550,735 B1 * | 4/2003 | Zheng | ............ | 248/304 |
| 2010/0181458 A1 * | 7/2010 | Liu | ............ | 248/363 |
| 2011/0095149 A1 * | 4/2011 | Fan | ............ | 248/206.2 |

* cited by examiner

*Primary Examiner* — A. Joseph Wujciak, III
(74) *Attorney, Agent, or Firm* — Sheridan Ross P.C.

(57) ABSTRACT

A cup body of a suction cup includes a flattenable curved disc portion made of a first elastic material, and an elastic cup portion made of a second elastic material and having the disc portion embedded therein. The first elastic material is stiffer than the second elastic material.

3 Claims, 3 Drawing Sheets

SUCTION CUP

BACKGROUND OF THE INVENTION

1. Field of the Invention

The invention relates to a suction cup suitable for hanging an object on a wall.

2. Description of the Related Art

A conventional suction cup includes an elastic cup body and a hook coupled to the cup body for hanging an object. In use, the cup body is pressed against a wall surface so that air between the cup body and the wall surface is expelled. Thereafter, when application of pressure on the cup body is ceased, the cup body tends to restore to its original shape, and a low-pressure space is formed between the cup body and the wall surface. The pressure difference between inner and outer sides of the cup body keeps the suction cup adhered to the wall surface.

However, if the elastic cup body lacks sufficient stiffness, adherence to the wall surface is weakened because the tendency of the cup body to restore to its original shape for forming the low-pressure space is weak. On the other hand, if the elastic cup body is too stiff, a good sealing effect for the low-pressure space is unlikely to be formed between the cup body and the wall surface. In both cases, adherence of the suction cup to the wall surface might not be strong enough to permit hanging of an object for long periods of time.

Another conventional suction cup includes an elastic inner cup disposed in a rigid outer cup. The outer cup is provided with a hook for hanging an object. A bolt extends threadedly into the outer cup and is coupled to the inner cup.

In use, the inner cup is placed intimately against a wall surface with a rim of the inner cup clamped tightly between the outer cup and the wall surface. The bolt is then operated to move the inner cup such that a low-pressure space is formed between the inner cup and the wall surface. Because the rim of the inner cup is clamped tightly between the outer cup and the wall surface, leakage of air into the low-pressure space may be avoided, thereby permitting hanging of an object for long periods of time. However, the need to operate the bolt when adhering such suction device on the wall surface arises in user inconvenience.

SUMMARY OF THE INVENTION

Therefore, the object of the present invention is to provide a suction cup that has improved adherence characteristics and that is easy to use.

According to the present invention, a suction cup includes a cup body having a flattenable curved disc portion made of a first elastic material, and an elastic cup portion made of a second elastic material and having the disc portion embedded therein. The first elastic material is stiffer than the second elastic material.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
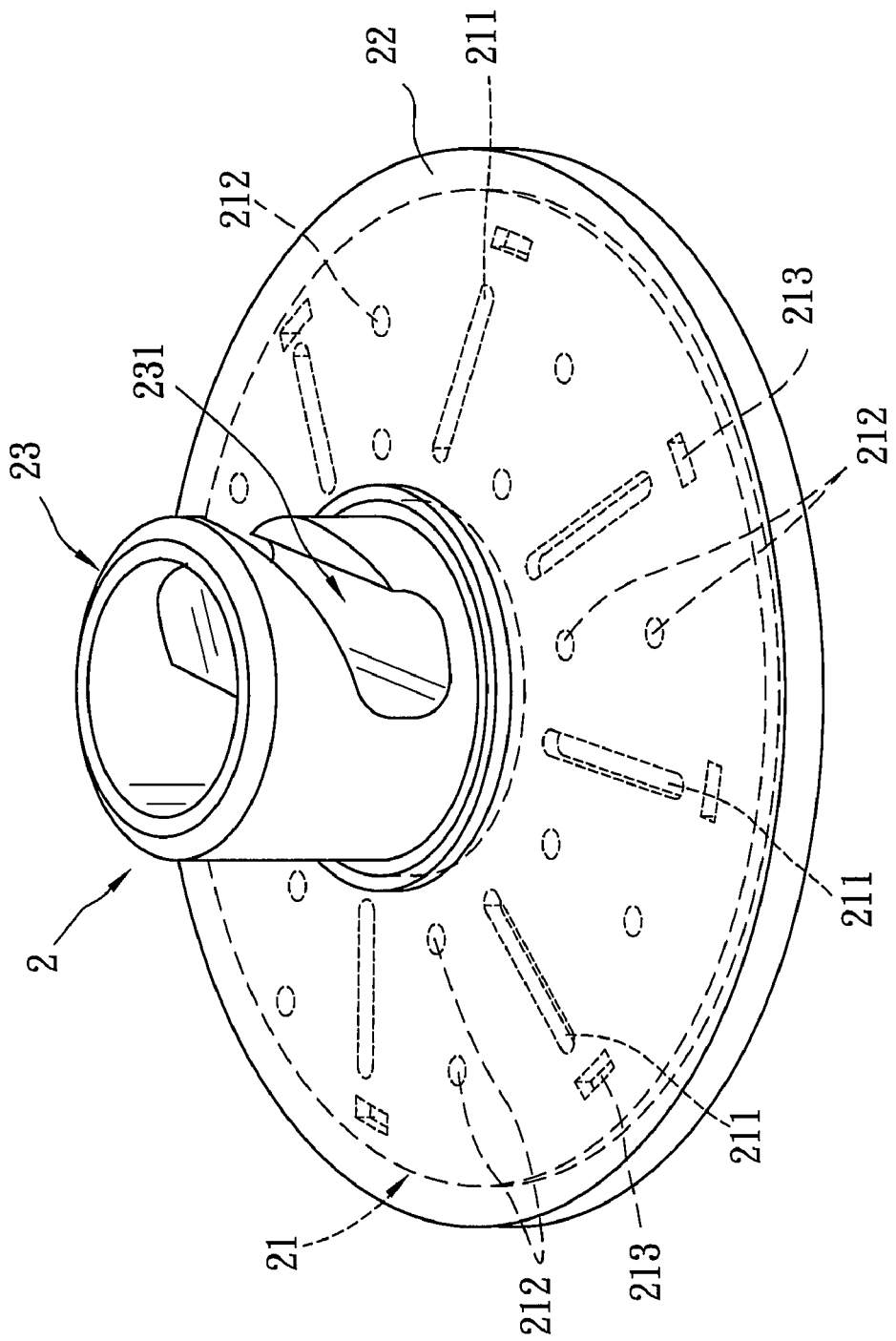
FIG. 1 is a perspective view of the preferred embodiment of a suction cup according to the present invention.
Figure 2:
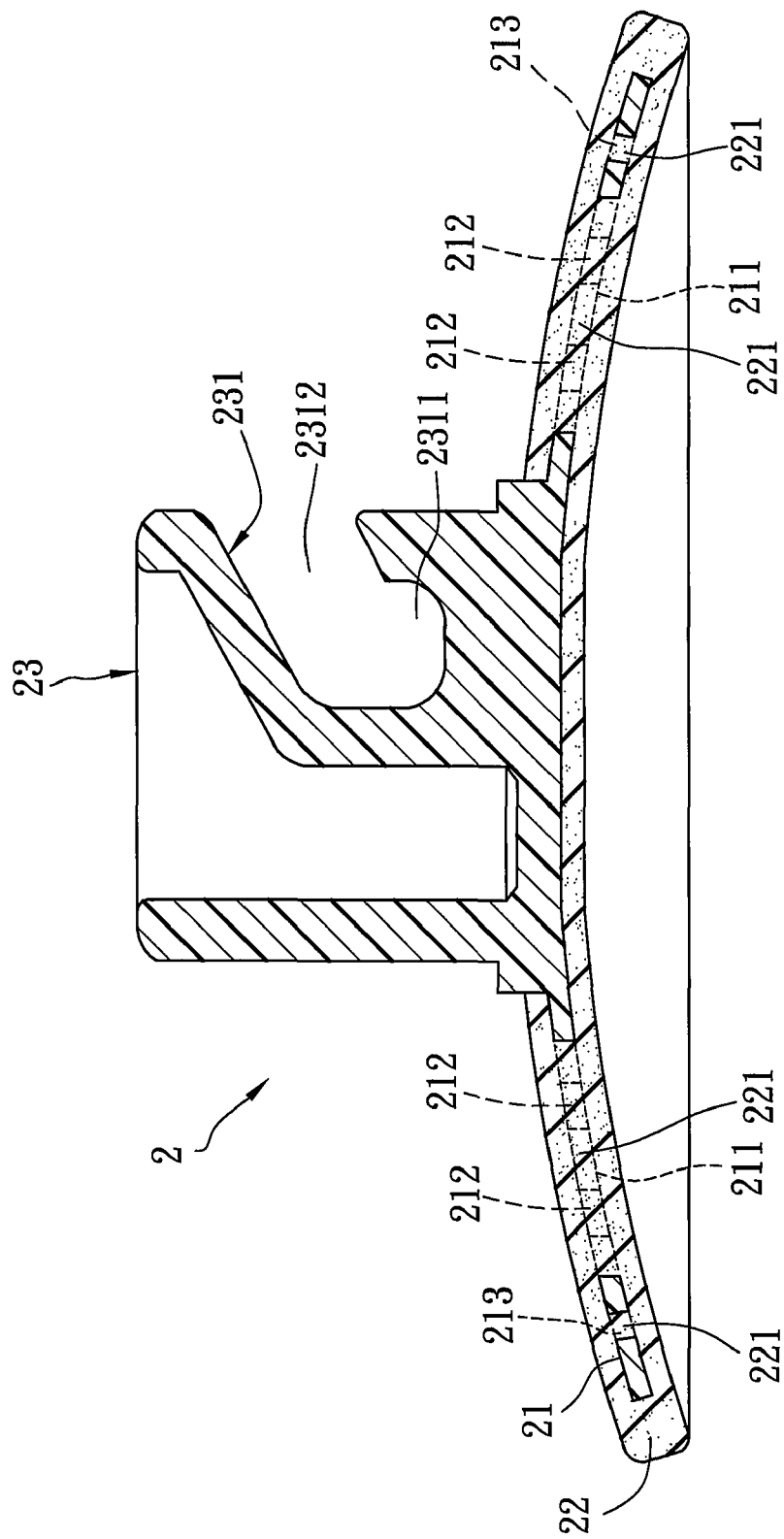
FIG. 2 is a sectional view of the preferred embodiment.

Referring to FIGS. 1 and 2, the preferred embodiment of a suction cup according to the present invention is shown to include a cup body 2 having a flattenable curved disc portion 21 made of a first elastic material, and an elastic cup portion 22 made of a second elastic material and having the disc portion 21 embedded therein. The first elastic material is stiffer than the second elastic material. Preferably, the first elastic material is a first plastic material that includes acrylonitrile-butadiene-styrene (ABS) resin, polyethylene (PE), polypropylene (PP), polystyrene (PS), or polyethylene terephthalate (PET), and the second elastic material is a second plastic material that includes rubber, silicone rubber, or polyethylene/polyvinyl chloride. However, as long as the first elastic material is stiffer than the second elastic material, other elastic materials may be used in accordance with a manufacturer's preference.

In this embodiment, the disc portion 21 is formed with a plurality of through-holes 211, 212 and 213, and the cup portion 22 is formed with a plurality of rib parts 221 that fill the through-holes 211, 212 and 213, respectively. The through-holes 211 are formed as elongate slots that radiate from a central part of the disc portion 21 toward a rim part of the disc portion 21. The through-holes 212 are circular holes arranged in pairs between adjacent ones of the through-holes 211. Each of the through-holes 213 is rectangular and is formed in the rim part of the disc portion 21 adjacent to a distal end of a corresponding one of the through-holes 211. By virtue of the rib parts 221 that fill the through-holes 211, 212, 213, the disc portion 21 and the elastic cup portion 22 may be firmly coupled to each other.

According to this embodiment, the suction cup includes a hanger portion 23 connected integrally to a convex side of the disc portion 21 and extending through the cup portion 22. The hanger portion 23 is in a form of a post and has an outer post surface formed with a hanger groove 231. Preferably, the hanger groove 231 has an inner retaining section 2311 and an outer access section 2312 that extends from the outer post surface to the inner retaining section 2311. The inner retaining section 2311 is for hanging an object and the outer access section 2312 is for guiding the object into or out of the inner retaining section 2311. In this embodiment, the outer access section 2312 is defined by an upwardly inclining guide face that is capable of guiding movement of the object into the inner retaining section 2311 and that is capable of hindering unintentional removal of the object from the hanger groove 231.

Figure 3:
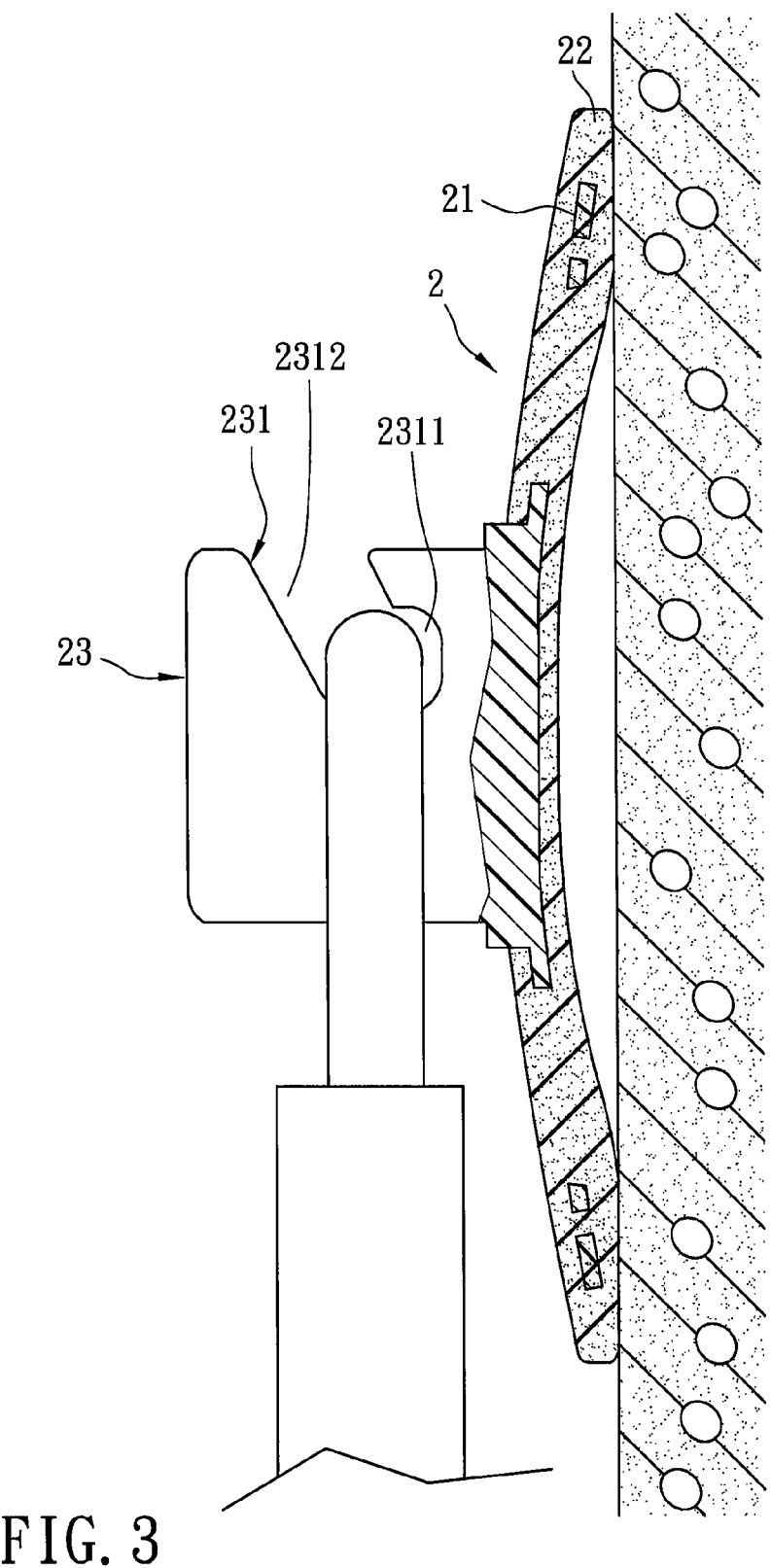
FIG. 3 is a sectional view to illustrate the preferred embodiment in a state of use.

As shown in FIG. 3, the user may hold the hanger portion 23 using one hand so as to press a concave side of the elastic cup portion 22 toward a wall surface, thereby flattening the disc portion 21. Thereafter, when the pressure applied to the suction cup is released, the disc portion 21 tends to restore to its original shape, thereby moving the cup portion 22 such that a low-pressure space is formed between the concave side of the cup portion 22 and the wall surface. The pressure difference between the opposite sides of the cup portion 22 keeps the suction cup adhered to the wall surface. It is noted that the suction cup should be adhered to the wall surface in a manner that the outer access section 2312 of the hanger groove 231 opens upwardly. An object may be hung on the hanger portion 23 once the suction cup has been adhered to the wall surface.

To sum up, in the suction cup of this invention, the cup body 2 includes a curved disc portion 21 embedded in an elastic cup portion 22 and made of an elastic material stiffer than that of the cup portion 22. Through the use of elastic materials having different stiffness for the disc portion 21 and the cup portion 22, the suction cup may ensure formation of a low-pressure space with a wall surface and may establish a good sealing effect for the low-pressure space between the rim part of the cup portion 22 and the wall surface. Accordingly, an object may be hung on the wall surface for a long time period using the suction cup of this invention. Moreover, the suction cup is convenient to use because it permits adhering on the wall surface using only one hand.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A suction cup comprising:
   a cup body including
   a flattenable curved disc portion made of a first elastic material, and
   an elastic cup portion made of a second elastic material and having said disc portion embedded therein, wherein said first elastic material being stiffer than said second elastic material; and
   a hanger portion connected integrally to said flattenable curved disc portion and extending through said elastic cup portion, said hanger portion being in a form of a substantially cylindrical post and having an outer circumferential surface formed with a hanger groove, said hanger groove having an inner retaining section, and an outer access section that is formed in said outer circumferential surface and that extends from said outer circumferential surface to said inner retaining section;
   wherein said disc portion is formed with a plurality of through-holes, and said cup portion is formed with a plurality of rib parts that fill said through-holes, respectively.

2. The suction cup as claimed in claim 1, wherein said first elastic material is a first plastic material that includes acrylonitrile-butadiene-styrene resin, polyethylene, polypropylene, poly-styrene, or polyethylene terephthalate, and said second elastic material is a second plastic material that includes rubber, silicone rubber, or polyethylene/polyvinyl chloride.

3. The suction cup as claimed in claim 1, wherein the perimeter lip of the elastic cup portion is in contact with the support surface when the suction cup is in use.

* * * * *